United States Patent
Alava et al.

(10) Patent No.: US 12,528,231 B2
(45) Date of Patent: Jan. 20, 2026

(54) METHOD AND APPARATUS FOR PRODUCING SOLID FOAM, PRODUCT AND USE

(71) Applicant: Woamy Oy, Espoo (FI)

(72) Inventors: Mikko Alava, Espoo (FI); Juha Koivisto, Espoo (FI); Antti Puisto, Espoo (FI)

(73) Assignee: Woamy Oy, Espoo (FI)

( * ) Notice: Subject to any disclaimer, the term of this patent is extended or adjusted under 35 U.S.C. 154(b) by 39 days.

(21) Appl. No.: 18/029,230

(22) PCT Filed: Oct. 4, 2021

(86) PCT No.: PCT/FI2021/050651
§ 371 (c)(1),
(2) Date: Mar. 29, 2023

(87) PCT Pub. No.: WO2022/074289
PCT Pub. Date: Apr. 14, 2022

(65) Prior Publication Data
US 2023/0356435 A1    Nov. 9, 2023

(30) Foreign Application Priority Data

Oct. 5, 2020 (FI) .................................. 20207160
Mar. 3, 2021 (FI) .................................. 20215231

(51) Int. Cl.
*B29B 7/74* (2006.01)
*B29B 7/88* (2006.01)
(Continued)

(52) U.S. Cl.
CPC .............. *B29B 7/7409* (2013.01); *B29B 7/88* (2013.01); *B29B 7/90* (2013.01); *B29C 35/10* (2013.01);
(Continued)

(58) Field of Classification Search
CPC .......... B29C 44/28; B29C 44/46; B29C 44/20
See application file for complete search history.

(56) References Cited

U.S. PATENT DOCUMENTS 4,104,207 A    8/1978 Pelikan et al.
4,771,078 A    9/1988 Schisler et al.
(Continued)

FOREIGN PATENT DOCUMENTS

CL    200300810 A1    4/2003
CL    2008000688 A1   9/2008
(Continued)

OTHER PUBLICATIONS

International Search Report for International Patent Application No. PCT/FI2021/050651 dated Dec. 23, 2021 (4 pages).
(Continued)

*Primary Examiner* — JaMel M Nelson
*Assistant Examiner* — Virak Nguon
(74) *Attorney, Agent, or Firm* — Merchant & Gould P.C.

(57) ABSTRACT

The application relates to a method and apparatus for producing a solid foam continuously. A homogeneous suspension is formed from a raw material in which the suspension comprises a solidifying agent, and a foam mixture which comprises bubbles is formed by mixing air bubbles into the suspension. The foam mixture is injected via at least one nozzle to form a foam pattern and the foam pattern is laid on a moving surface and the foam mixture of the foam pattern is solidified in order to form a solid foam such that the bubbles of the foam mixture shrink in off-length directions to form the shaped bubbles. Further, the application relates to the product and the use of the method.

9 Claims, 6 Drawing Sheets

(51) Int. Cl.
*B29B 7/90* (2006.01)
*B29C 35/10* (2006.01)
*B29C 44/28* (2006.01)
*B29C 44/46* (2006.01)
*B29K 201/00* (2006.01)
*B29K 225/00* (2006.01)
*B29K 307/04* (2006.01)
*B29K 311/14* (2006.01)

(52) U.S. Cl.
CPC .............. B29C 44/28 (2013.01); B29C 44/46 (2013.01); *B29K 2201/08* (2013.01); *B29K 2225/06* (2013.01); *B29K 2307/04* (2013.01); *B29K 2311/14* (2013.01)

(56) References Cited

U.S. PATENT DOCUMENTS

| | | | |
|---|---|---|---|
| 7,799,967 | B2 | 9/2010 | Ranganathan et al. |
| 8,894,397 | B2 | 11/2014 | Candiracci |
| 9,789,456 | B2 | 10/2017 | Capron et al. |
| 9,790,349 | B2 | 10/2017 | Neisius et al. |
| 10,357,936 | B1 | 7/2019 | Vincent et al. |
| 2002/0088581 | A1* | 7/2002 | Graef .................. D21F 11/002 162/158 |
| 2003/0220039 | A1* | 11/2003 | Chen ....................... D04H 1/68 442/327 |
| 2004/0265563 | A1* | 12/2004 | Sakai ................... B29C 44/352 428/315.7 |
| 2007/0116924 | A1* | 5/2007 | Mizone ................. B29C 44/302 425/461 |
| 2010/0092597 | A1 | 4/2010 | Candiracci |
| 2011/0111998 | A1 | 5/2011 | Barraza et al. |
| 2013/0045380 | A1* | 2/2013 | Lewis .................. C09D 175/00 521/170 |
| 2019/0022623 | A1 | 1/2019 | Tennison et al. |

FOREIGN PATENT DOCUMENTS

| | | |
|---|---|---|
| CN | 201810602082 A | 6/2018 |
| CN | 108659614 A | 10/2018 |
| EP | 1693174 A1 | 8/2006 |
| EP | 2114645 B1 | 6/2011 |
| JP | 5254982 B2 | 8/2013 |
| KR | 100779776 B1 | 11/2007 |
| WO | 99615518 A1 | 12/1999 |
| WO | 2015036659 A1 | 3/2015 |
| WO | 2015066806 A1 | 5/2015 |
| WO | 2020011587 A1 | 1/2020 |

OTHER PUBLICATIONS

Written Opinion of the International Searching Authority for International Patent Application No. PCT/FI2021/050651 dated Dec. 23, 2021, (6 pages).
Finnish Search Report for Application No. 20215230 dated Sep. 17, 2021 (2 pages).
Nagata, S. et al. "A New Method for Estimating the Cellular Structure of Plastic Foams Based on Dielectric Anisotropy" Polymer Engineering and Science, May 1995, 39(5):896-903.
Finnish Office Action for Application No. 20215230 dated Sep. 29, 2022 (7 pages).
Lavoine et al., "Nanocellulose-based foams and aerogels:Processing, properties, and applicagios", Journal of Materials Chemistry A, May 2017, DOI:10.1039/C7TA02807E, (14 Pages).
Office Action dated Mar. 4, 2024 for the corresponding Chilean Patent Application No. 202300987 (27 pages including English Translation).

* cited by examiner

METHOD AND APPARATUS FOR PRODUCING SOLID FOAM, PRODUCT AND USE

CROSS-REFERENCE TO RELATED APPLICATIONS

This application is a National Stage Application of PCT/FI2021/050651, filed 4 Oct. 2021, which claims benefit of application No. 20207160, filed 5 Oct. 2020 in Finland, and application No. 20215231, filed 3 Mar. 2021 in Finland, and which applications are hereby incorporated by reference in their entireties. To the extent appropriate, a claim of priority is made to each of the above disclosed applications.

FIELD

The application relates to a method and an apparatus for producing a solid foam continuously. Further, the application relates to a product and a use of the method. Solid foams, such as bio-based solid foams, can be produced and products can be produced from the solid foams.

BACKGROUND

Manufacturing of bio-based solid foams by the liquid foam route is showing up as a promising method to obtain new lightweight materials. Presently, the foams produced using this route are isotropic by their structure due to the slow drying in high temperature environments, which also tends to simultaneously relax the bubble shapes. In many applications a lightweight material with wood-like properties having high strength in one direction and good thermal conduction in the other would be beneficial. Specifically, the thermal insulation in such anisotropic structures is superior compared to their isotropic counterparts.

One way to produce anisotropic foams is using freeze casting, for example Lavoine, N. & Bergstrom, L. (2017), Nanocellulose-based foams and aerogels: processing, properties, and applications, Journal of Materials Chemistry A, 5(31), 16105-16117, where first the bubbles are forced into elongated shapes by high pressure, and then the foam is frozen using low temperature gas. After freezing the pressure is decreased causing the water to sublimate from the foam while leaving its structure intact. This method is rather expensive due to the machinery required for the high pressure and the energy consumption for the freezing.

From WO2020011587A1 is known a porous material of cellulose fibres and gluten. In this application, a method creating a stiff biodegradable isotropic foam is described with the hydrophobic structures.

From WO2015036659A1 is known a method of forming a fibrous product. The continuous roll-to-roll processes produce thin or bulky paper-like sheets. Here, the fiber forming focuses on mould casting that does not scale up as well as a continuous process. In addition, the foam is claimed to be an isotropic mixture, not anisotropic nor elongated. The foam thus does not have significant orientation dependent strength differences.

From U.S. Pat. No. 10,357,936 is known an insulation panel. In the insulation panel, the protective cover layers and insulation layers are bound together.

Further, from US20110111998A1 is known a modification of particulate-stabilised fluid-fluid interfaces, from JP5254982B2 is known a tubular film manufacturing apparatus, from CN201810602082A is known a silver nanowire conductive ink for screen printing and preparation method thereof, from U.S. Pat. No. 9,789,456B2 is known a composition comprising an internal phase dispersed in a hydrophilic continuous phase, from U.S. Pat. No. 7,799,967B2 is known a differentially expanding absorbent structure, from US979034B2 is known a flame retardant wood plastic composite, from U.S. Pat. No. 4,104,207A is known a process for production of cellular cavities in thermoplastic material in which a medium which forms gas bubbles is bound to a carrier, from US20190022623A1 is known a shaped nanoporous body, and from EP2114645B1 is known a base material, method of production and use thereof.

SUMMARY

The method, apparatus, product and use are characterized by what are presented in the claims.

In the method and apparatus for producing a solid foam continuously a suspension is formed from a raw material, a foam mixture is formed from the suspension and the foam mixture is injected and solidified to produce a solid foam.

The method for producing a solid foam continuously can comprise steps: forming a homogeneous suspension from a raw material in which the suspension comprises a solidifying agent, forming a foam mixture which comprises bubbles by mixing air bubbles into the suspension, and injecting the foam mixture via at least one nozzle, such as through at least one nozzle, to form a foam pattern, laying the foam pattern on a moving surface and solidifying the foam mixture of the foam pattern in order to form a solid foam such that the bubbles of the foam mixture shrink and deform in off-length directions to form the shaped bubbles. The shrinking and deformation process of the foam mixture and bubbles can happen in connection with the nozzle, during the injection of the foam mixture, between the nozzle and moving surface and/or during the solidifying. In an embodiment, an anisotropic solid foam is formed.

The anisotropy may be utilized for superior thermal insulation and mechanical properties in solid foam materials. Anisotropic solid foams have been difficult to prepare due to basic foam physics causing the bubble shape to relax to isotropic shapes immediately after the external stress is removed. In bio-based foam manufacture from a wet state this occurs during the drying process. Therefore, in the preparation of bio-based anisotropic foams complex and non-scalable methods such as freeze-drying are required. This application encloses a method to generate anisotropic foams in a continuous roll-to-roll process allowing for scalability to mass production.

The apparatus for producing a solid foam continuously can comprise at least one mixer for forming a homogeneous suspension from a raw material in which the suspension comprises a solidifying agent, at least one foamer for forming a foam mixture which comprises bubbles by mixing air bubbles into the suspension, and at least one nozzle for injecting the foam mixture to form a foam pattern, a moving surface on which the foam pattern is laid and at least one solidifying device for solidifying the foam mixture of the foam pattern to form a solid foam such that the bubbles of the foam mixture shrink and deform in off-length directions to form the shaped bubbles. The shrinking and deformation process of the foam mixture and bubbles can happen in the nozzle, during the injection of the foam mixture, between the nozzle and moving surface and/or during the solidifying.

In an embodiment, the bubbles of the foam mixture can be shrunk in off-length directions to form elongated bubbles, such as elongated rod like bubbles. In an embodiment, the bubbles of the foam mixture can be shrunk in off-length directions to form disc shaped bubbles, e.g. disc-like or penny shaped bubbles. The shaping of the bubbles can be made in connection with the nozzles, during the injection of the foam mixture, between the nozzles and moving surface, during the solidifying or during the drying or their combinations. In an embodiment, the injection of the foam mixture via the nozzles and the laying of the foam mixture on the moving surface have an influence on the shaping of the bubbles.

In the method and apparatus any suitable raw material can be used. In an embodiment, a raw material is a biobased material. In an embodiment, the raw material is the bio-based material selected from the group consisting of biomass, bio-based residue material, wood, wood-based material, forest-based material, cellulose, treated bio-based material, untreated bio-based material, or their combinations. In an embodiment, the raw material comprises a solidifying agent. In an embodiment, the solidifying agent is added to the raw material and/or to the suspension. In an embodiment, the solidifying agent comprises plastic, metal and/or other component which has a melting point. In an embodiment, the raw material comprises fibers. In an embodiment, a solid fibre material is added to the raw material and/or to the suspension. In an embodiment, a chemical as the solidifying agent is added to the suspension. In an embodiment, the chemical which lowers surface tension, increases viscosity and facilitates a solidification is added to the suspension. In an embodiment a solvent, e.g. water or xylene, is added for forming the suspension.

In an embodiment, the apparatus comprises at least one addition device to add the chemical, solid fiber material and/or solvent to the suspension.

In an embodiment, the chemical is a methylcellulose, carboxymethyl cellulose (CMC), photopolymer or one of their combinations. In an embodiment, the chemical is methylcellulose, derivate of the methylcellulose, carboxymethyl cellulose (CMC), hydroxypropyl cellulose, ethyl cellulose, or the like, or one of their combinations. In an embodiment, the chemical is the methylcellulose, its derivate, nanocellulose, microcellulose and their combinations. In an embodiment, the chemical is carboxymethyl cellulose (CMC). In an embodiment, the chemical is the photopolymer. The selected chemical is used as the solidifying agent, and further the chemical can be used as a rheomodifying agent, surfactant and/or fiber material. In an embodiment, a surfactant agent is added to the suspension.

In an embodiment, the fibers in the raw material or suspension comprises carbon fibers, carbon nanotubes, graphene, carbon mesh, laponite, hemp, expanded polystyrene, polystyrene, polymer, polymer sticks, yarn and their combinations. In an embodiment, the solid fibre material added to the raw material and/or suspension is selected from the group consisting of carbon fibers, carbon nanotubes, graphene, carbon mesh, laponite, hemp, expanded polystyrene, polystyrene, polymer, polymer sticks, yarn and their combinations. When the suspension comprises fibers, the fibers of the raw material and/or solid fibre material can orientate according to the shaped bubbles, such as elongated bubbles.

In an embodiment, the apparatus comprises more than one nozzle, e.g. at least two nozzles. In an embodiment, the foam mixture is injected via the nozzles to form the foam pattern.

In an embodiment, the foam mixture is treated by an extruder, and the foam mixture is injected from the extruder to the moving surface. In an embodiment, the foam mixture is formed in the extruder. In an embodiment, the apparatus comprises at least one extruder comprising at least one nozzle.

The foam pattern can be formed by laying. The laying means in this context any laying, injection moulding, extruding or the like or their combinations. In an embodiment, the pattern is formed by extruding. For example, in the extrusion can be created a shear for shaping the bubbles.

The moving surface can be any moving device, for example a moving plate, conveyor, belt or the like or their combinations. In an embodiment, the moving surface moves linearly. In an embodiment, the moving surface moves at the speed of 0.1 mm/s to 50 m/s.

In an embodiment, the foam mixture is solidified by heat, photocatalytes, crosslinking, freezing or their combinations. In an embodiment, the foam mixture is solidified by heat so that radiant heat, conductive heat and/or convective heat is used in the solidification. The foam mixture can be dried during the solidification or before or after the solidification.

In an embodiment, the solidifying device comprises at least one heater for solidifying the foam mixture by heat so that radiant heat, conductive heat and/or convective heat is used. In an embodiment, the apparatus comprises at least one radiant heater as the heater. In an embodiment, the apparatus comprises at least one oven as the heater. In an embodiment, the apparatus comprises at least one heated moving plate as the heater. In an embodiment, the moving plate is a hot plate, and the solidification is carried out by the hot plate and the radiant heater.

In an embodiment, the foam mixture is solidified at temperature of 1-90° C. In an embodiment, the foam mixture is solidified at temperature of 30-90° C.

In an embodiment, the apparatus comprises at least one rheomodifier for changing rheological properties of the foam mixture and/or solid foam.

In an embodiment, the apparatus comprises at least one transporter for transporting the foam mixture or the solid foam to a storage area.

In an embodiment, the pattern is a stripe, plate, predetermined structure, complex structure or their combination. In an embodiment, the foam pattern is the foam stripe, which comprises elongated rod like bubbles. In an embodiment, the foam pattern is formed from parallel foam stripes. In an embodiment, the foam pattern is the foam plate, which comprises disc shaped bubbles, e.g. disc-like or penny shaped bubbles. In an embodiment, the foam pattern is the foam shape, such as predetermined structure or complex structure, which comprises bubbles with predetermined shape or shapes. Such shapes include for example bubbles with a 2D-projection that is I-shaped, H-shaped, u-shaped, z-shaped, hollow o-shaped or their combination. In an embodiment, the foam pattern is an anisotropic solid foam.

In an embodiment, when orientated rod-shaped structure, e.g. by elongated bubbles, is created, the compression strength increases in one direction and reduces in the cross direction.

In an embodiment, a desired product can be formed from one or more foam patterns. In an embodiment, the product is a bulk product, film, rod, plate, block or their combination. In an embodiment, the product is formed from the foam stripes by laying the foam stripes together. The product can be obtained by the method described above, and the method can comprise the method according to any of its embodiments. In an embodiment, the solid foam is obtained by the method and the solid foam comprises a foam mixture formed from a suspension comprising a solidifying agent and bubbles, and the bubbles in the solid foam has been shrunk in off-length directions to form the shaped bubbles, and the foam mixture has been injected to form a foam pattern and the foam mixture of the foam pattern has been solidified to the solid foam. In an embodiment, the product is an anisotropic solid product.

In an embodiment, the product, e.g. a superstructure product, can be formed from more foam patterns, from at least two foam patterns. In an embodiment, the product is laminated, layered or similar larger scale structure which comprises more than one foam patterns and in which the foam patterns are combined to form the product. In an embodiment, product comprises at least two foam patterns arranged one on top of the other to form a layered structure, and each foam pattern is arranged in a desired direction on top of one another in the structure. In an embodiment, the product is formed from the foam stripes. In an embodiment, the product is formed by arranging the foam patterns one on top of the other such that each foam pattern is arranged at desired angle to each other. In an embodiment, the flat foam patterns are arranged one on top of the other. In an embodiment, the foam patterns are arranged one on top of the other such that the foam pattern having the first direction alternates with the foam pattern having the second direction in the structure. In an embodiment, a layer of the foam patterns is dried, and another layer of the foam patterns are arranged on top of the existing layer. In an embodiment, the product is a cube or other layered structure.

In an embodiment, the method is used in a continuous process, a roll-to-roll process, a packaging industry, a construction industry or their combinations.

It is to be understood that the embodiments described above may be used in any combination with each other. Several of the embodiments may be combined together to form a further embodiment of the invention.

The method, apparatus and products described above have many advantages compared to previously known methods, apparatuses and products.

In previously known processes, a Cellufoam process aims at creating a) a hydrophobic and b) a rigid foam structure by manipulating the bubble film structures. In the present invention, the geometry of the bubbles can be modified.

In an embodiment, the present method is based on 1) the modification of the rheological properties of the bubble films by lowering their surface tension and by increasing their viscosity by the addition of the chemical, e.g. methylcellulose or carboxymethyl cellulose (CMC), and 2) laying the foam in stripes. Point 1) allows for increased drying times at elevated temperatures without losing the bubble shapes. Point 2) causes the bubbles to experience tension due to elongated shape which causes shrinkage of the bubble in the off-length direction. The method can produce anisotropic foam stripes that can be laid together to form more complex structures in a continuous process.

This method allows, unlike the previous solutions, for setting up a roll-to-roll process for producing large quantities of anisotropic foams and for allowing their use in applications with high foam demand, such as in packaging and construction industries.

The process requires in-depth understanding and combining of colloidal and foam rheology and is therefore highly non-trivial.

The present invention enables manufacturing of different foams, e.g. anisotropic foams, without such complications in a continuous, scalable roll-to-roll process. For example, a continuous process is impossible to reach by freeze casting.

In the present invention specifically tailored bio-based solid foams can be manufactured.

BRIEF DESCRIPTION OF THE DRAWINGS

The accompanying drawings, which are included to provide further understanding of the invention and constitute a part of this specification, illustrate some embodiments of the invention and together with the description help to explain the principles of the invention. In the drawings.

DETAILED DESCRIPTION

The detailed description provided below in connection with the appended drawings is intended as a description of examples and is not intended to represent the only forms in which the example may be constructed or utilized. However, the same or equivalent functions and structures may be accomplished by different examples.

Figure 1:
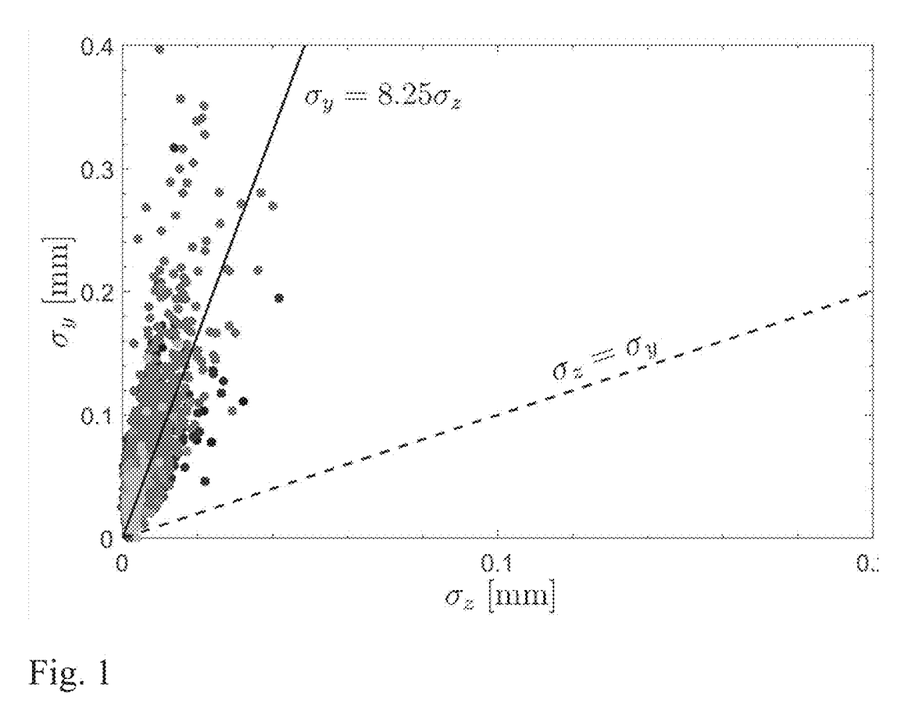
FIG. 1 illustrates the measured elongation of the bubbles which shows that the dimension in the direction of elongation (y-axis) is eight times the elongation in cross direction (z-axis) for 8 different samples.
Figure 2:
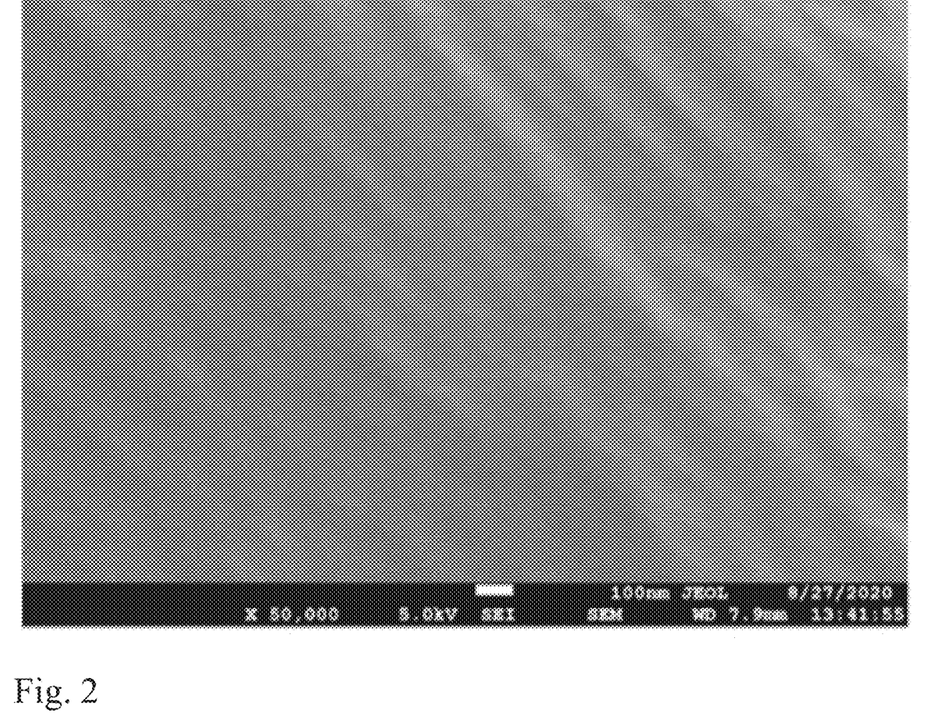
FIG. 2 illustrates the elongation in the bubble walls which causes the fiber structure in the walls to orient creating high strength in the orientation direction.
Figure 3:
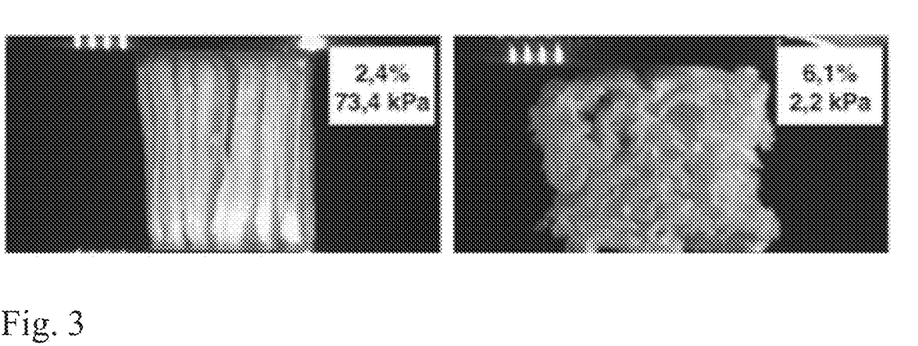
FIG. 3 illustrates a structure, in which the orientation dependent structure has been created by the process with significantly larger compression strength along the bubbles and fibers (left) than in cross direction (right)
Figure 4:
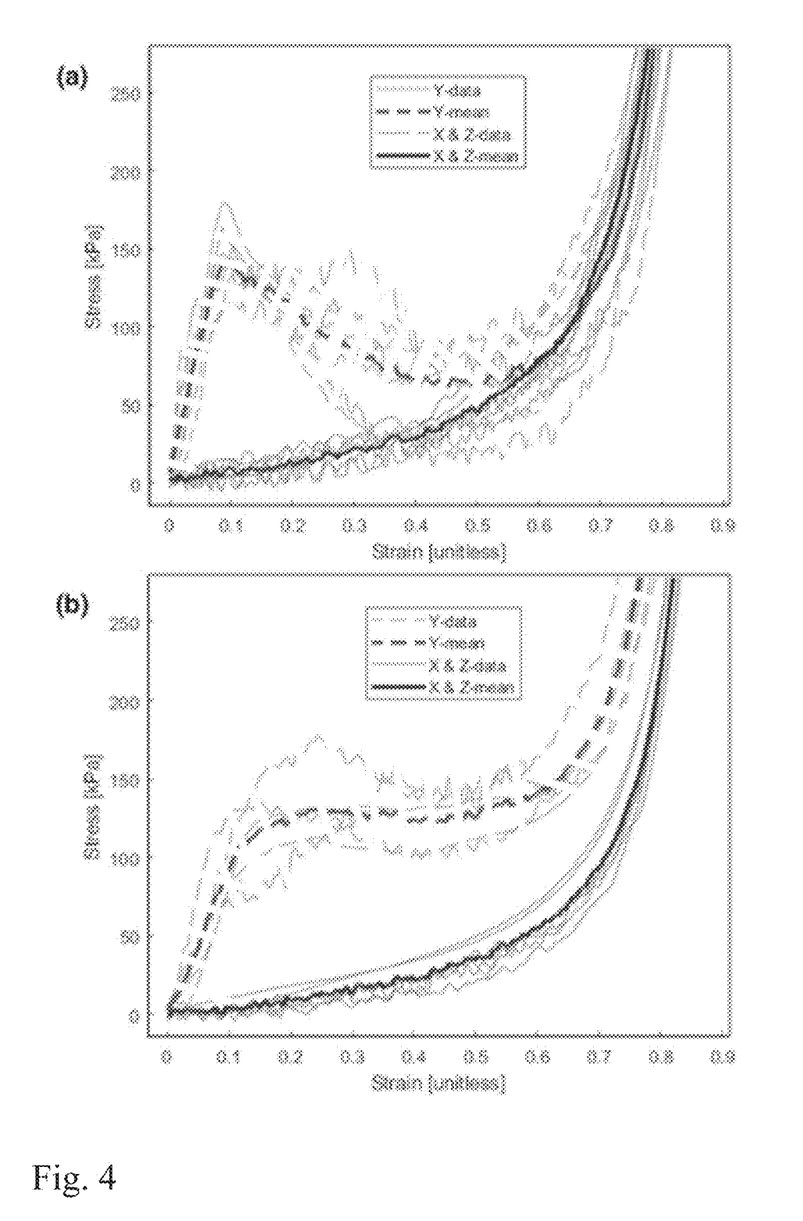
FIG. 4 illustrates that modifying the process changes the way in which the bubbles interact with each other causing dramatic differences in the stress-strain response, and FIGS. a) and b) illustrate four different groups of material with different orientation and manufacturing process.
Figure 5:
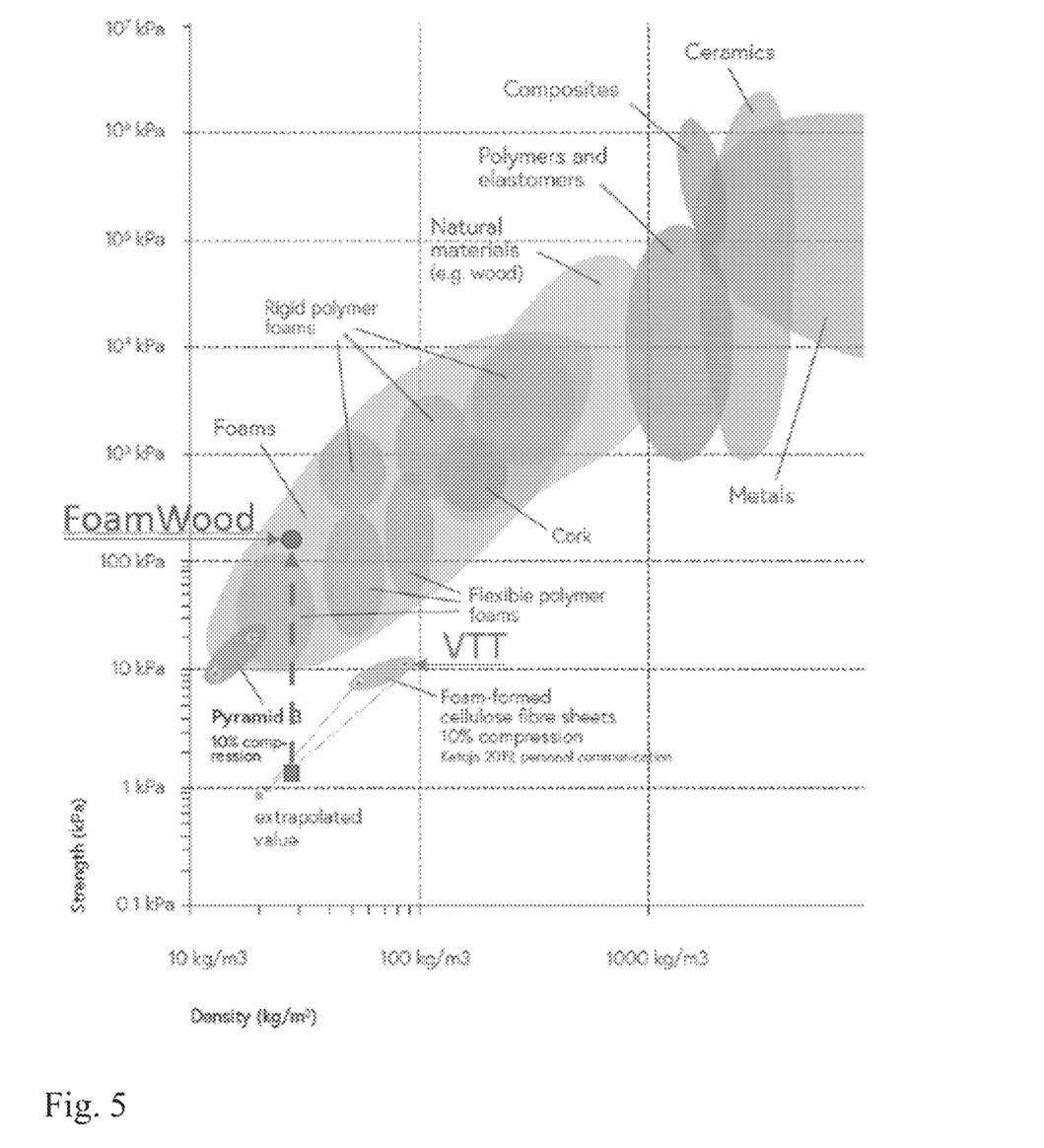
FIG. 5 illustrates comparison of FoamWood's strength per density to other materials which shows that while the cross strength (square) is lower than the average foam, the strength in the bubble elongation direction is very good (circle) for a biobased material.

FIG. 1 illustrates a measurement of the anisotropic bubbles in 8 different samples. The dimension in the elongation direction (y-axis) is 8 times the dimension in the cross direction (z-axis). The elongation leads to oriented fibre structures in the bubble walls illustrated in the high magnification image in FIG. 2. The small-scale structure in the bubble walls can be inherited to the large-scale structures, as shown in FIG. 3. FIG. 4 shows that the practical gain is revealed in the accompanying compression tests as the stress-strain (load-displacement) curves are clearly different depending on the orientation. For instance, at the strain of 0.1, the difference in the load carrying capacity is nearly 100-fold along the elongated axis of the bubbles compared to the cross direction. FIG. 5 shows how the strength/density of FoamWood compares to other materials.

Figure 6:
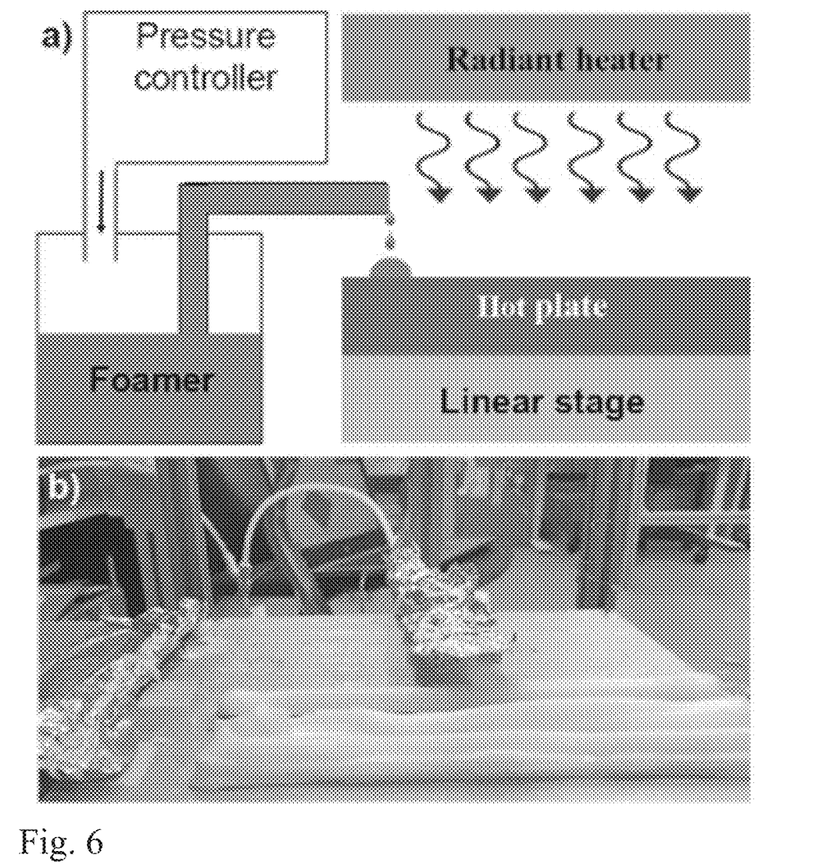
FIG. 6 illustrates a single extrusion process comprising a schematic a) and a photograph b) illustrations, and in the process the drying of the rods under tension in temperature above the viscous transition of the methylcellulose jams/arrests the bubble and thus the fiber structure to oriented state.

In the process, a homogeneous suspension containing solid fiber ingredients is prepared and mixed with a sufficient amount of methyl cellulose (MC). The suspension is then pumped into a capillary, where a junction is used to mix the air bubbles in the suspension to form the foam. The foam is laid on a moving surface, e.g. a wire surface, a solid surface and/or an even surface, using a set of capillary nozzles producing a set of foam stripes on the moving surface. These stripes of foam pass under an infrared heater, which elevates the temperature increasing the rate of evaporation, and causing the MC effect as explained below.

The MC acts as 1) a surface-active agent lowering the surface energy of the suspension allowing it to be foamed and 2) a rheology modifier in the suspension increasing the viscosity of the suspension increasing the bubble shape relaxation times. Furthermore, the MC rheological behaviour is peculiar in a sense that the MC particles tend to swell as a function of the temperature. This leads to a situation, where the foam effectively arrests as the temperature of the foam is increased during drying causing the structure to solidify and arrest.

Drying of liquid foams always leads to its shrinkage due to reduction in the amount of material (water) in the structure. When the foam is laid in stripes on the wire the shrinkage can be utilized to cause additional stress towards the bubbles in the off-length direction because in the length direction shrinkage is not possible. This in turn adds on to the anisotropy of the bubbles.

FIG. 6 shows the schematic illustration of the device in a small-scale production. The foam is driven onto the hot moving plate from the foamer, via controlled air pressure. The linear moving plate moves as the foam is extruded, creating a solid rod-shaped object which is dried by the radiant heater. The process can be repeated until desired amounts of rods are deposited onto the moving plate one next to each other. The rods are dried using the radiant heater. Further, once the layer of the rods is fully dried another layer can be created on top of the existing layer.

Figure 7:
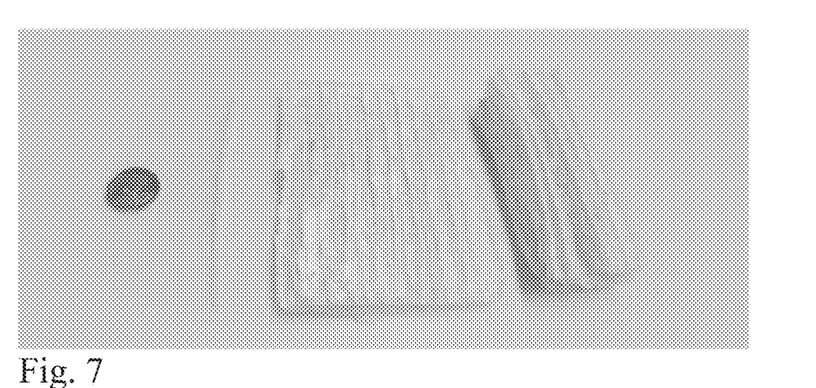
FIG. 7 illustrates examples of bulk products, rod, plate and a block.
Figure 8:
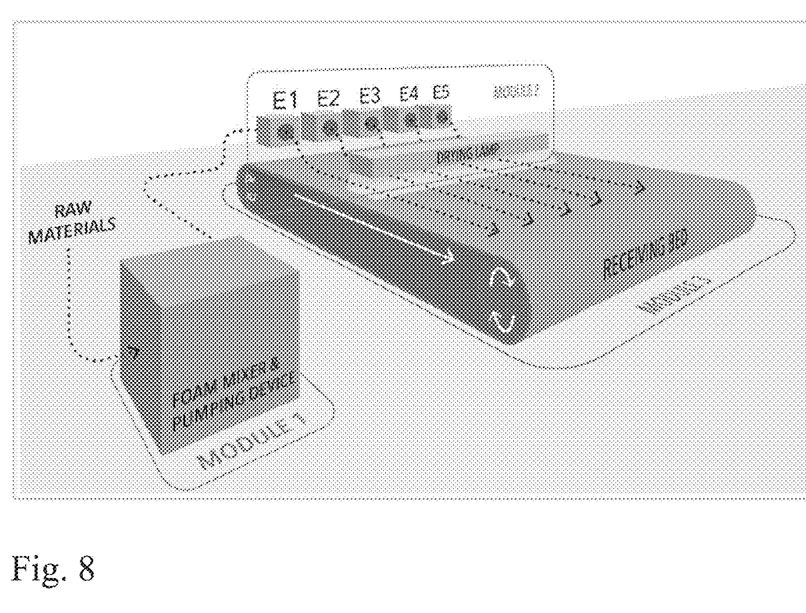
FIG. 8 illustrates a schematic illustration of many parallel extrudes with one (or more) foam generators generate plate like objects in a continuous process.

The process produces rod and plate like objects that can be laminated to a block shown in FIG. 7. The FIG. 8 shows a large-scale machine capable of producing continuously the foam using multiple extruders.

A foamer is a device for creating foams with user specific bubble radius and polydispersity; average bubble radii from 10 um to 100 mm with polydispersity 0.01 percent to 100 percent or the bubble radii. The polydispersity is the standard deviation of the radii of the bubbles. The foam production is continuous as the raw materials are continuously injected with pressure, e.g. by air, liquid or screw pump or similar method. The output is continuously injected to an extruder with a screw pump or similar device. The output can be other device for e.g. quality control or storage unit. The foamer can be rheomodified heated, cooled or shaken with ultrasonics or sonic to affect flow of raw materials or foam.

The extruder is a device which dispersers the bubbles onto the moving surface and/or transporter and which injects foam from the foamer. The dispersion creates internal shear that elongates the bubbles and creates a pattern for creating internal structures to foam. The patterns can be flat, rodlike, ridged, zikzak, on-off, dotted, dashed, wavy or combination or similar. Number of extruders can be one or more in parallel operation. Number of extruders or set of parallel extruders can operate in series. For example, the extruders can operate with following cases: independently with pattern different from others, in sync with same pattern with others, zero or more number of extruders operate independently with same or different pattern, and/or zero or more extruders operate in sync. The sync means both temporal and spatial sync e.g. different phase (staring time) of dotted pattern or different pattern or different starting location of the pattern. The extruder can comprise a rheomodified shake with ultrasonics or sonic to affect the flow of raw materials or foam.

Zero to multiple extruders can move to make the pattern. Zero to multiple extruders can be stationary to make the pattern.

The solidifier, such as the solidifying device, is a device which the changes the rheological properties of the foam from its liquid-like stage to solid-like stage. A solid-like stage can be a gel or solid or highly viscous stage with viscosity over 100 Pa·s (Pascal-second). The solidifying method can be heat (0-5000 degree celsius), cold (−273 to 0 degrees celcius), light including lasers, leds, heat, gas discharge, ultrasonic, sonic, magnetic, charged (remove charge screening by e.g. salt), chemical and/or pressure or similar. The solidifying method depends on the material and is a material dependent parameter. For example, methylcellulose is solidified with heat. The methylcellulose solidifies in high temperatures from 30 degrees Celsius to 80 degrees Celsius depending on the degree of substitution. Heat can be infrared (radiant heat), conductive or convective via carrier gas. Water is solidified in low temperatures below 0 degrees. Alcohol solidifies in low temperatures below −4 degrees. Photopolymers solidify in UV light. Shear thickening materials, e.g. cornstarch, solidify in sonic and ultrasonic vibration. Shear thinning materials solidify when sonic or ultrasonic vibration is stopped. Iron powder solidifies in magnetic field. Sand or granular matter solidifies under pressure or loading. Charged particles solidify when the charge screening is removed, e.g. charged stabilised cellulose when salt is added. Chemical solidification can be made by crosslinking e.g. mixing two components similar to epoxy resin.

A transporter is a device or operator, e.g. human or robot, that can transport the foam from the extruder to storage area. An example of the transporter is a conveyer belt, moving plate or similar.

A rheomodifier, such as a rheomodifying device, is a device that changes the rheological (load-displacement) properties of the materials and/or foam during the manufacturing. The modification uses the same methods as the solidifier but during the process starting from the injection of materials to the storaging of the foam. A solidifier can act as a rheomodifier.

The method and apparatus are suitable in different embodiments for using in different industrial processes. The method and apparatus are suitable in different embodiments for producing effectively different foam products from different raw materials.

The invention is not limited merely to the embodiments and examples referred to above; instead many variations are possible within the scope of the inventive idea defined by the claims.

The invention claimed is:

1. A method for producing a solid foam continuously, in which a homogenous suspension is formed from a raw material, air is added to the homogenous suspension to form a foam mixture, and the solid foam is formed from the foam mixture, wherein the method comprises:

forming the homogeneous suspension from a bio-based raw material comprising fibers in which the homogenous suspension comprises a solidifying agent;

adding a chemical which lowers surface tension and increases viscosity to the homogenous suspension and which is selected from methylcellulose, derivate of the methylcellulose, carboxymethyl cellulose, hydroxypropyl cellulose, ethyl cellulose, or one of their combinations;

forming the foam mixture which comprises bubbles by mixing air bubbles into the homogenous suspension; and treating the foam mixture by an extruder and injecting the foam mixture from the extruder to a moving surface via at least one nozzle to form a foam pattern which comprises parallel foam stripes to create a rod-shaped structure and laying the foam pattern on the moving surface and solidifying the foam mixture of the foam pattern using heat in order to form the solid foam having anisotropic properties and comprising bubbles such that the bubbles of the foam mixture shrink in off-length directions to form elongated bubbles in the solid foam.

2. The method according to claim 1, wherein the chemical is a photopolymer.

3. The method according to claim 1, wherein a solid fibre material is added to the raw material and/or the homogenous suspension, and the solid fibre material is selected from the group consisting of carbon fibers, carbon nanotubes, graphene, carbon mesh, laponite, hemp, expanded polystyrene, polystyrene, polymer, polymer sticks, yarn and their combinations.

4. The method according to any one of claim 1, wherein the bio-based raw material is selected from the group consisting of biomass, bio-based residue material, wood, wood-based material, forest-based material, cellulose, treated bio-based material, untreated bio-based material, or their combinations.

5. The method according to claim 1, wherein the foam mixture is solidified by heat, photocatalytes, crosslinking, freezing or their combinations.

6. The method according to claim 1, wherein the foam mixture is solidified at temperature of 1-90° C.

7. The method according to claim 1, wherein a product is formed from one or more foam patterns.

8. A solid foam product obtained by the method according to claim 1, wherein the solid foam comprises a foam mixture comprising a solidifying agent.

9. The solid foam product according to claim 8, wherein the solid foam product comprises at least two foam patterns arranged one on top of the other to form a layered structure, and each foam pattern is arranged in a desired direction on top of one another in the layered structure.

* * * * *